(12) United States Patent
Tilland et al.

(10) Patent No.: US 11,913,640 B2
(45) Date of Patent: Feb. 27, 2024

(54) DEVICE AND METHOD FOR CHEMICAL LOOPING COMBUSTION, HAVING A PARTICLE SEPARATOR PROVIDED WITH AN INCLINED INTAKE DUCT

(71) Applicants: IFP Energies nouvelles, Rueil-Malmaison (FR); TOTAL RAFFINAGE CHIMIE, Courbevoie (FR)

(72) Inventors: Airy Tilland, Rueil-Malmaison (FR); Benjamin Amblard, Rueil-Malmaison (FR); Sina Tebianian, Rueil-Malmaison (FR); Ann Cloupet, Rueil-Malmaison (FR); Florent Guillou, Rueil-Malmaison (FR); Stephane Bertholin, Rueil-Malmaison (FR); Mahdi Yazdanpanah, Le Havre (FR)

(73) Assignees: IFP ENERGIES NOUVELLES, Rueil-Malmaison (FR); TOTAL RAFFINAGE CHIMIE, Courbevoie (FR)

( * ) Notice: Subject to any disclaimer, the term of this patent is extended or adjusted under 35 U.S.C. 154(b) by 495 days.

(21) Appl. No.: 17/278,399

(22) PCT Filed: Sep. 13, 2019

(86) PCT No.: PCT/EP2019/074583
§ 371 (c)(1),
(2) Date: Mar. 22, 2021

(87) PCT Pub. No.: WO2020/058141
PCT Pub. Date: Mar. 26, 2020

(65) Prior Publication Data
US 2021/0356120 A1 Nov. 18, 2021

(30) Foreign Application Priority Data
Sep. 20, 2018 (FR) .................... 18/58.511

(51) Int. Cl.
F23C 10/10 (2006.01)
F23C 9/00 (2006.01)
F23J 15/02 (2006.01)

(52) U.S. Cl.
CPC .............. *F23C 10/10* (2013.01); *F23C 9/003* (2013.01); *F23J 15/022* (2013.01);
(Continued)

(58) Field of Classification Search
CPC .......... F23C 10/10; F23C 9/003; F23J 15/022
(Continued)

(56) References Cited

U.S. PATENT DOCUMENTS

2013/0149650 A1* 6/2013 Gauthier ................ F23C 10/10
431/170

FOREIGN PATENT DOCUMENTS

| CN | 202546743 U | 11/2012 |
|----|-------------|---------|
| FR | 2960940 A1 | 12/2011 |
| FR | 2960941 A1 | 12/2011 |

OTHER PUBLICATIONS

International Search Report for PCT/EP2019/074583, dated Nov. 26, 2019; English translation submitted herewith (4 pgs.).

* cited by examiner

*Primary Examiner* — Vivek K Shirsat
(74) *Attorney, Agent, or Firm* — FITCH, EVEN, TABIN & FLANNERY, LLP (57) ABSTRACT

The present invention relates to a device and a method for chemical looping combustion, for which the end of the intake duct (4) opening out within the chamber of the separator (1) is inclined with respect to a horizontal plane (H).

15 Claims, 4 Drawing Sheets

(52) U.S. Cl.
CPC .............................. *F23C 2206/10* (2013.01); *F23C 2900/10001* (2013.01); *F23C 2900/99008* (2013.01); *F23J 2217/60* (2013.01)

(58) Field of Classification Search
USPC ............................................................ 431/2
See application file for complete search history.

DEVICE AND METHOD FOR CHEMICAL LOOPING COMBUSTION, HAVING A PARTICLE SEPARATOR PROVIDED WITH AN INCLINED INTAKE DUCT

CROSS-REFERENCE TO RELATED APPLICATIONS

This application is a U.S. national phase application filed under 35 U.S.C. § 371 of International Application No. PCT/EP2019/074583, filed Sep. 13, 2019, designating the United States, which claims priority from French Patent Application No. 18/58.511, filed Sep. 20, 2018, which are hereby incorporated herein by reference in their entirety.

The present invention pertains to the field of particle separation, and more specifically the separation of metal oxide particles from unburnt particles together where appropriate with fly ash, in the context of chemical looping combustion for producing energy, synthesis gas and/or hydrogen.

Chemical looping combustion (CLC) involves contacting a gaseous, liquid and/or solid hydrocarbon feedstock with an oxygen-carrying metal oxide solid in a chamber at high temperature. The metal oxide gives up part of the oxygen it contains, and this oxygen participates in the combustion of the hydrocarbons.

At the end of the combustion, the fumes contain predominantly oxides of carbon, water and optionally hydrogen. This is because there is no need for the hydrocarbon feedstock to be contacted with air. The fumes are therefore composed predominantly of combustion gases, and optionally of a dilution gas used for the transport and fluidization of the particles, or a gas (for example, water vapor) which promotes gasification of solid fuel.

It is therefore possible, after condensing, to produce fumes which are predominantly free of nitrogen and have high carbon dioxide $CO_2$ contents (generally of more than 90 vol % or even 98%), providing the possibility of capture and then storage of $CO_2$. Having taken part in the combustion, the metal oxide is then transported to another reaction chamber, where it is contacted with air or another oxidizing gas, to be reoxidized.

The implementation of a chemical looping combustion method necessitates substantial amounts of metal oxides in order to burn all of the fuel. These metal oxides are generally present either in ore particles or in particles resulting from industrial treatment (metalworking or mining industry residues, spent catalysts from the chemical industry or from refining). It is also possible to use synthetic materials, such as, for example, alumina or silica-alumina supports, on which possibly oxidized metals will be deposited (nickel, for example). The maximum oxygen capacity actually available varies considerably from one oxide to another, and is generally between 0.1 and 15%, and often between 0.3 and 6% by weight. For carrying out the combustion, therefore, it is particularly advantageous to operate in a fluidized bed. The reason is that finely divided oxide particles circulate more easily in the oxidation and combustion reaction chambers, and also between these chambers, if the particles are endowed with the properties of a fluid.

Patent application FR 2 850 156 describes a chemical looping combustion process for which the solid fuel is ground before entering the reduction reactor, which operates as a circulating fluidized bed. The reduced size of the solid fuel particles enables more complete and more rapid combustion. Separation downstream of the circulating bed is accomplished first by a cyclone and then by a device which allows the unburnt particles to be separated from the metal oxide particles. This prevents unburnts being carried into the oxidizing zone, and therefore prevents $CO_2$ emissions in the effluents from the oxidizing reactor.

The particle separator is fluidized with steam, which allows the fine and light particles, such as the carbonaceous residue, to be separated and to be re-introduced into the reactor, while the denser and coarser oxide particles are transferred to the oxidizing reactor.

Patent application FR 2 896 709 is directed to a particle separator operating in a chemical looping process. This separator is fed with the flow of particles transporting oxygen, which are mixed with the solid fuel. In the separator, the particles flow as a dense phase, following a twisting path and passing through chicanes, hence enabling control over the residence time and promotion of the separation of the light particles (unburnt particles) from the heavy particles (metal oxides). The particles are then introduced into a fluidizing zone, with this fluidization being controlled by means situated on the base of the separator but also in the wall of the deflectors, thereby allowing the lightest particles to be entrained, these particles being subsequently recycled to the fluidizing reactor.

The operation of the separator according to patent application FR 2 896 709 gives rise to a number of significant drawbacks.

For instance, the separation efficiency is reduced because of a limitation on the capacity for entrainment of the particles into the gaseous phase. The reason is that, in order to entrain substantial amounts of particles, it is necessary to employ substantial amounts of gas and also substantial free sections.

Moreover, in a dense phase, it is impossible to separate entirely two different solid phases. The reason is that the upward movement of the gas bubbles has the paradox of causing light particles to fall back down to the dense phase, and prevents complete separation.

Moreover, the geometry of the separator in FR 2 896 709 is highly complicated, owing to the presence of internals, and particularly of asymmetric internals. This geometry is problematic because of the mechanical stresses borne by the materials making up the separator under the temperature conditions of the CLC process, generally of more than 800° C. Indeed, although the outer walls are often protected by a refractory cement and remain at low temperature, this is not the case for the inner walls, which are subject to the conditions of the process.

To overcome these drawbacks, patent application FR 2 960 941 (WO 2011/151537) relates to a particle separator in which the mixture of particles from the combustion zone is contacted with a gas stream from the combustion zone and/or from an external gas source. This mixture then enters the dilute phase of the particle separator. In the particle separator, the rate of gas flow is controlled so as to allow the heaviest particles to settle (essentially, metal oxide particles), while the lightest particles (essentially, unburnt particles) are entrained to the upper part of the particle separator, to be recycled to the combustion zone.

This type of particle separator is satisfactory owing, in particular, to effective separation of the particles. It is nevertheless desirable to make the distribution of the flow of particles in the separator more homogeneous, so as to optimize the performance of the particle separator.

With this aim, the present invention relates to a device and a method for chemical looping combustion as described in patent application FR 2 960 941 (WO 2011/151537), for which the end of the intake duct opening out within the chamber of the separator is inclined with respect to a horizontal plane. This inclination of the intake end allows material to be admitted according to a partially lateral direction (that is, a direction with a horizontal component), thereby allowing for more homogeneous distribution of the flow of particles in the particle separator. Accordingly, the performance of the particle separator is enhanced, especially in terms of particle separation, and it is possible to reduce the height of the particle separator, and therefore to limit its cost, and a fortiori to improve the performance and to reduce the costs of the device and of the chemical looping combustion process.

The Device and the Method According to the Invention

The invention relates to a device for chemical looping combustion using a solid fuel which generates unburnt particles and employs oxygen carrier particles, such as metal oxides, and which comprises at least a combustion zone, a separator for particles contained in a gas mixture from said combustion zone, and a gas-solid separator, said particle separator comprising a chamber equipped with at least one intake duct connected to said combustion zone, at least one discharge duct situated in the lower part of said chamber, and at least one outlet duct situated in the upper part of said chamber and connected to said gas-solid separator, said chamber comprising a dense phase in the lower part and a dilute phase in the upper part. Said intake duct comprises an intake end which is inclined by an angle α with respect to a horizontal plane, said intake end opening out within said chamber.

According to one embodiment, said angle α is between 10 and 70°, and preferably between 30 and 50°.

Advantageously, said intake duct comprises successively, in the intake direction, a vertical portion, an elbow, and said inclined intake end.

Preferably, said vertical portion of said intake duct is at a distance D from the center of said chamber, D being strictly positive and less than 4 A, preferably less than 2 A and more preferably less than 1.5 A, where A is a dimension between the center of said chamber and a sidewall of said chamber.

In accordance with one implementation, the diameter C of said inclined intake end is between 0.5 and 4 L, preferably between 1 L and 3 L, more preferably between 1 L and 2 L, where L is the diameter of said vertical portion of said intake duct.

According to one aspect, said intake duct is entirely external to said chamber, the intake end opening out on a sidewall of said chamber.

Alternatively, said intake duct is at least partly internal to said chamber, said intake duct passing through the lower wall of said chamber.

Advantageously, said particle separator comprises between 1 and 20, preferably between 1 and 10 and more preferably between 1 and 4 intake ducts.

In accordance with one embodiment, said intake duct opens out in said chamber, in the upper part of said chamber comprising said dilute phase.

According to one characteristic, the inclination of said intake end of said intake duct is directed toward the longitudinal axis of said chamber.

Furthermore, the invention relates to a method for chemical looping combustion using a solid fuel generating unburnt particles, which employs oxygen carrier particles, such as metal oxides, and employs a device for chemical looping combustion according to any of the preceding characteristics. For this method, the following steps are carried out:

a) a gaseous mixture from said combustion zone, comprising particles and combustion gases, is admitted to the chamber of said particle separator by means of at least one intake duct;

b) the lightest particles, consisting predominantly of the unburnt particles, are extracted via an outlet in the upper part of said chamber, and the heaviest particles, consisting predominantly of the oxygen carrier particles, are discharged via said discharge duct in the lower part of said chamber;

c) a gaseous stream comprising the light unburnt particles extracted via said outlet duct in the upper part of the chamber are sent to said gas-solid separator;

d) a gas depleted in unburnt particles is discharged from said gas-solid separator via a duct; and e) the unburnt particles separated in said gas-solid separator are recycled to said combustion zone via a communication duct.

BRIEF PRESENTATION OF THE FIGURES

Other features and advantages of the method and of the device according to the invention will become apparent upon reading the following description of nonlimiting exemplary embodiments with reference to the appended figures described below.

DETAILED DESCRIPTION OF THE INVENTION

Figure 1:
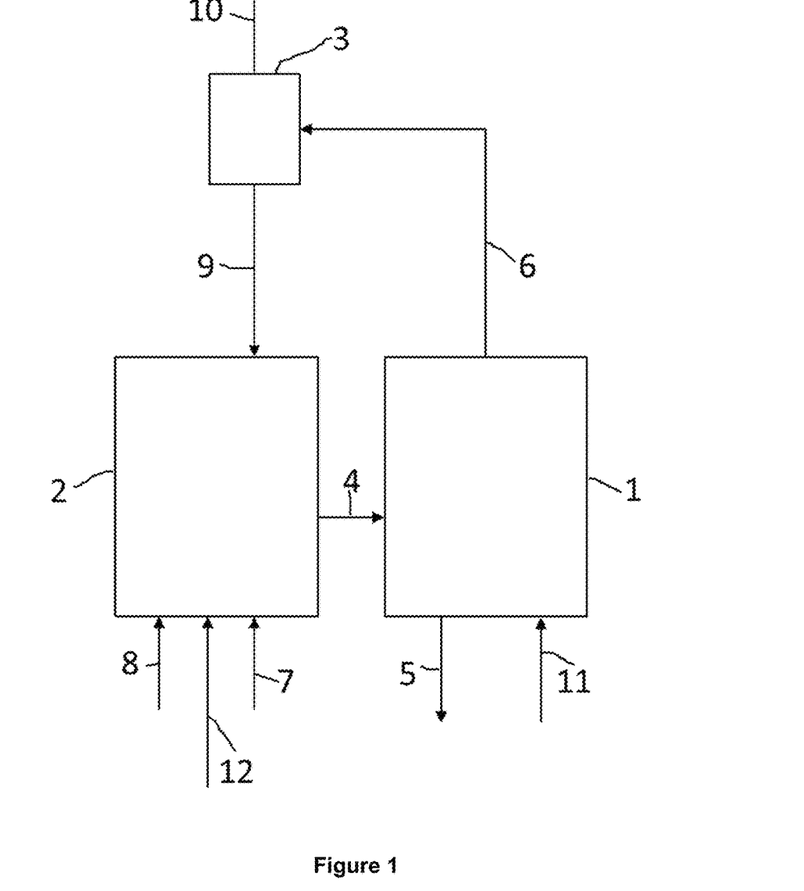
FIG. 1 illustrates the device and the method for chemical looping combustion according to one embodiment of the invention.

FIG. 1 describes, schematically and nonlimitingly, the device and the method for chemical looping combustion according to one embodiment of the invention.

Zone 2 represents the combustion zone of a chemical looping combustion (CLC) method; introduced into this zone are a solid feedstock via a duct 7, oxygen-carrying particles via a duct 8 from the oxidizing zone (not shown) of the CLC method, and a fluidizing gas supplied via a duct 12, such as, for example, steam or $CO_2$, for promoting the fluidization of the oxide particles.

The solid feedstock (or fuel) treated in the combustion zone consists generally of a solid hydrocarbon source containing predominantly carbon and hydrogen. The feedstock is selected advantageously from coal, coke, petcoke, biomass, bituminous sands, and household waste.

This combustion zone 2 is able to operate in a fluidized bed in dense phase or in a circulating fluidized bed, or else according to an arrangement of beds consisting of a dense phase and a transport phase.

Advantageously, the velocity of the gas in the upper part of the combustion zone is between 1 and 10 m/s.

A flow of particles containing metal oxide particles, referred to as heavy particles, and light particles, comprising unburnt particles and possibly fly ash, all in a gaseous flow, is extracted from the combustion zone 2 and is subsequently introduced into a particle separator 1 via at least one intake duct 4.

The gaseous flow comes entirely or partly from the combustion zone 2 and is composed predominantly of CO, $CO_2$, $H_2$ and $H_2O$, the balance possibly being from an external source containing, for example, recycled $CO_2$ and/or steam, introduced via the pipe 11 in the lower part of the separator 1.

Preferably all of the gaseous combustion effluents are utilized for the separation of particles, and very preferably the total gas flow in the separator 1 may consist of at least 60% of the effluents from the combustion zone. Separation between the heavy particles and the light particles takes place in this particle separator 1, with the heavy particles depositing in the lower part of the particle separator, before being extracted from it via a discharge duct 5, and the light particles being carried to the upper part, before being extracted via an outlet duct 6, and then introduced into a gas-solid separator 3, for example a cyclone.

The purpose of this cyclone 3 is to separate the gas depleted in unburnt particles, which is subsequently extracted via a duct 10, and the unburnt particles, which are entrained with the metal oxide particles extracted via a duct 9 and recycled to the combustion zone 2.

The heavy particles extracted in the lower part of the particle separator 1 consist predominantly of metal oxides and may be sent to a second combustion zone, in which the oxygen carrier will be further reduced, or to an oxidizing zone, enabling the oxygen carrier to regain at least part of the oxidation state which it had at the entry to the combustion zone 2, and the lightest unburnt particles are recycled to the combustion zone, after separation from the gaseous effluent.

Therefore, as described in patent application FR 2 960 941 (WO 2011/151537), the intake and discharge/outlet parameters are selected so as to produce, in the chamber of the particle separator 1, a dense phase in the lower part of the chamber of the particle separator, and a dilute phase in the upper part of the chamber of the particle separator, and the intake duct 4 opens out preferably in the dilute phase.

The particles which settle in the lower part form a dense phase consisting of the heaviest particles, with a greater or lesser height in the separator depending on factors including the density of the particles, the feed rates and extraction rates; however, the level of said dense phase, forming the interface with the dilute phase, is preferably situated below the intake 4 opening out in the separator, to allow the introduction of the mixture of particles extracted from the combustion zone.

The present invention relates more particularly to the particle separator. According to the invention, the particle separator of the chemical looping combustion device comprises:
- a chamber, in which the particles are separated, the chamber comprising a dense phase in its lower part and a dilute phase in its upper part, with the particles being separated by elutriation,
- at least one intake duct, connected to said combustion zone, for transferring the flow from the combustion zone to the chamber of the particle separator,
- at least one discharge duct situated in the lower part of the chamber, for discharging the heavy particles, and
- at least one outlet duct situated in the upper part of the chamber, for discharging the light particles and the gas.

In the present description, a chamber comprising a dense phase in its lower part and a dilute phase in its upper part refers to a chamber suitable for comprising a dense phase in its lower part and a dilute phase in its upper part when the separator is not in operation. In operation, the chamber effectively comprises a dense phase in its lower part and a dilute phase in its upper part.

According to the invention, the intake duct comprises an intake end which is inclined (by an angle α) with respect to a horizontal plane. The intake end is the end of the intake duct that opens out into the chamber of the particle separator. The intake end is said to be inclined, since it is neither vertical nor horizontal. In other words, the angle α is between 1 and 89°. The inclination of the intake end allows the flow to be taken in according to a direction which comprises a lateral component (that is, a horizontal component). This inclination of the flow allows homogeneous distribution over the cross section of the chamber, thus enabling an improvement in the performance of the particle separator (improved separation and reduced cost).

According to one embodiment of the invention, the angle α may be between 10 and 70°, preferably between 30 and 50°. These angular ranges for inclination of the intake end permit optimized distribution, while avoiding excessively horizontal intake, which would carry a risk of entrainment of the flow toward the bottom, and preventing excessively vertical intake, which would carry the risk of intake in the form of a jet, similar to the effect in the prior art described in particular in patent application FR 2 960 941 (WO 2011/151537). Moreover, these angular ranges make it possible to limit the effects of erosion of the intake duct, which might exist if the angle α were too low.

The inclined intake end may preferably be directed toward the center of the chamber (or its longitudinal axis), to promote separation.

Moreover, the inclined intake end may be directed to the upper part of the chamber, to carry the particles to the upper part of the chamber.

In accordance with one implementation of the invention, the intake duct may comprise successively, in the intake direction, a vertical portion, an elbow and the inclined intake end. A design of this kind for the intake duct allows simple manufacture of the intake duct.

According to one preferred embodiment of the invention, the intake duct may be entirely external to the chamber. In this case, the intake end opens out on a sidewall of the chamber. Through this embodiment it is possible to limit the internals in the chamber, meaning that no element of the intake duct passes through a wall of the chamber. Furthermore, this embodiment makes it possible to do without specific internal elements: in particular, a conical element positioned above the intake duct, which is provided in certain solutions in the prior art (cf. FIG. 5b, which will be described later on in the description). Such a conical element, indeed, may break up the flows, which is not necessarily desirable, and is subject to erosion.

As a variant, the intake duct may be at least partly internal to the chamber. In this case, the intake duct passes through the lower wall of the chamber. For the embodiment in which the intake duct comprises a vertical portion, an elbow and the intake end, it may be the vertical portion which passes through the lower wall of the chamber. In this variant there is no need for the conical element breaking up the flows.

According to one aspect of the invention, the particle separator may comprise between 1 and 20, preferably between 1 and 10 and more preferably between 1 and 4 intake ducts.

The particle separator may advantageously comprise a plurality of intake ducts. This configuration promotes the homogeneity of the flows in the chamber.

When the particle separator comprises a plurality of intake ducts, the intake ducts may preferably be regularly spaced over the sidewall or walls of the chamber, or in the chamber, so as to optimize the homogeneity of the flows in the chamber.

The chamber may comprise an inlet of an external gas source allowing the fluidization of the dense zone.

Preferably, in order to separate the particles, the intake duct opens out in the upper part of the chamber, at a height corresponding to the dilute phase within the chamber.

According to one embodiment of the invention, the intake end may further comprise an inclination with an angle of ε via a vertical plane.

The geometry of the separator may be parallelepipedal, cylindrical, or any other three-dimensional geometry.

Generally speaking, the material used for producing the chamber of the separator may be selected from high-temperature steels, as for example of the Hastelloy®, Incoloy®, Inconel® or Manaurite® type, or else ceramics.

In order to limit manufacturing costs, it is also possible to consider standard steels bearing applied layers of reinforced refractory cement (with thicknesses generally of between 2 and 50 cm, generally in the region of 20 cm) on the internal faces exposed to flow and to high temperatures, for the outer parts of the separator. Likewise possible is the use of refractory bricks.

Another configuration consists of walls comprising tubes in which a heat-transfer fluid circulates, as for example steam, and these tubes may also be produced with standard steels.

The metal oxide particles, such as, for example, oxides of Fe, Ti, Ni, Cu, Mn, Co and V, are used alone or as a mixture, and have an average size in general of more than 50 microns, preferably of between 100 and 500 microns.

The supported or unsupported, synthetic or mineral metal oxides generally have a density of more than 1200 $kg/m^3$. For example, the nickel oxide particles supported on alumina ($NiO/NiAl_2O_4$) generally have a grain density of between 2500 and 3500 $kg/m^3$, depending on the porosity of the support and on the nickel oxide content, and typically of approximately 3200 $kg/m^3$.

Ilmenite, an ore combining titanium and iron, has a density of 4700 $kg/m^3$.

The particle separator according to the present invention is used advantageously for separating the unburnt particles from metal oxide particles having a density of more than 1200 $kg/m^3$, preferably more than 2500 $kg/m^3$.

The oxygen transporter particles generally have a much greater size and density than those of the fly ash and of the unburnt particles having already been in contact with the oxygen-transporting particles in the combustion zone at high temperature. As an example, at the outlet from the combustion zone, it is considered that the size of the unburnt coal particles is less than 100 microns and that the majority of the particles have a size of less than 50 microns. The density of these particles is in general between 1000 and 1500 $kg/m^3$.

Other particles, such as the fly ash, resulting from the combustion of the solid feedstock may also circulate with the remainder of the particles, and are characterized by a lower particle size and lower density than the oxygen carrier particles, and often also lower than the unburnt particles.

FIGS. 2a to 2d illustrate, schematically and nonlimitingly, four embodiments of the invention. These figures illustrate solely the chamber of the particle separator 1 and two intake ducts 4.

Figure 2:
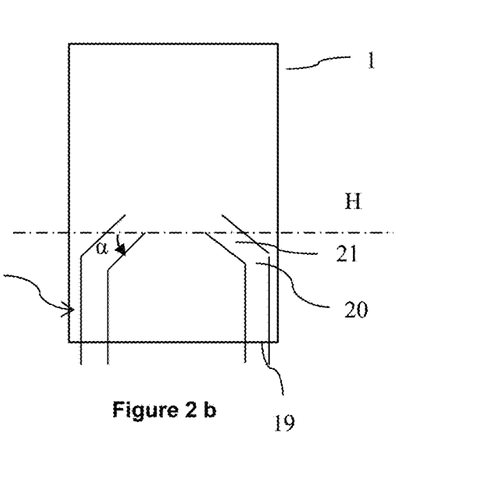
FIGS. 2a to 2d illustrate the intake duct of the particle separator according to four embodiments of the invention.
Figure 2A:
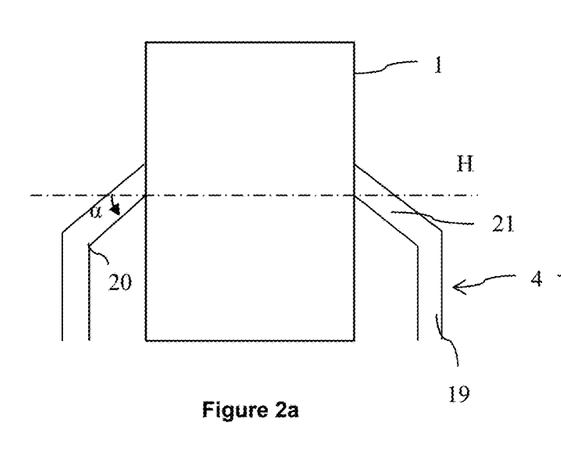

FIG. 2a corresponds to an embodiment for which the two intake ducts 4 are entirely external. The intake ducts 4 comprise successively, in the intake direction, a vertical portion 19, an elbow 20, and an intake end 21 inclined by an angle α with respect to a horizontal plane H. The intake end 21 opens out on a sidewall of the chamber. For this embodiment, the vertical portion 19, the elbow 20 and the intake end 21 are entirely external to the chamber.

FIG. 2b corresponds to an embodiment for which the two intake ducts 4 are partially internal to the chamber of the particle separator 1. The intake ducts 4 comprise successively, in the intake direction, a vertical portion 19, an elbow 20, and an intake end 21 inclined by an angle α with respect to a horizontal plane H. The vertical portion 19 passes through the lower wall of the chamber. For this embodiment, a part of the vertical portion 19, the elbow 20 and the intake end 21 are internal to the chamber.

Figure 2C:
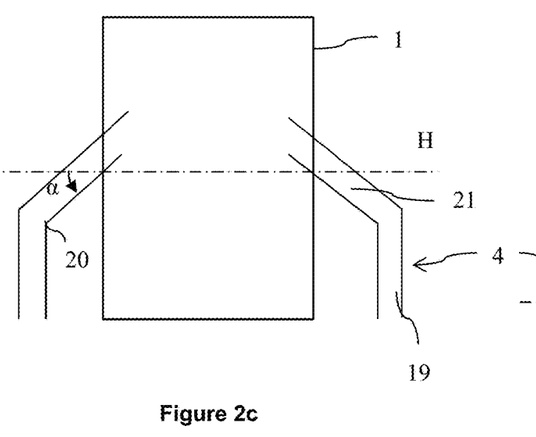

FIG. 2c corresponds to an embodiment for which the two intake ducts 4 are partially internal to the chamber of the particle separator 1. The intake ducts 4 comprise successively, in the intake direction, a vertical portion 19, an elbow 20, and an intake end 21 inclined by an angle α with respect to a horizontal plane H. The intake end 21 passes through the sidewall of the chamber. For this embodiment, the vertical portion 19, the elbow 20, and a portion of the intake end 21 are external to the chamber, while another portion of the intake end 21 is internal to the chamber.

Figure 2D:
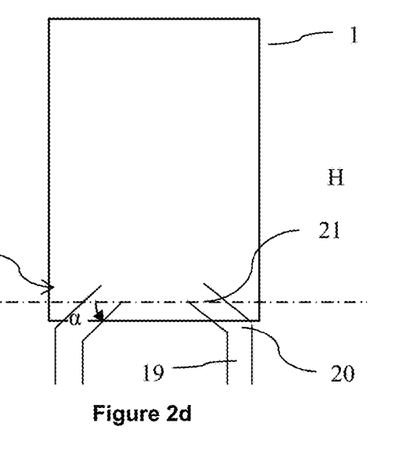

FIG. 2d corresponds to an embodiment for which the two intake ducts 4 are partially internal to the chamber of the particle separator 1. The intake ducts 4 comprise successively, in the intake direction, a vertical portion 19, an elbow 20, and an intake end 21 inclined by an angle α with respect to a horizontal plane H. The intake end passes through the lower wall of the chamber. For this embodiment, the vertical portion 19, the elbow 20, and a portion of the intake end 21 are external to the chamber, while another portion of the intake end 21 is internal to the chamber.

Figure 3:
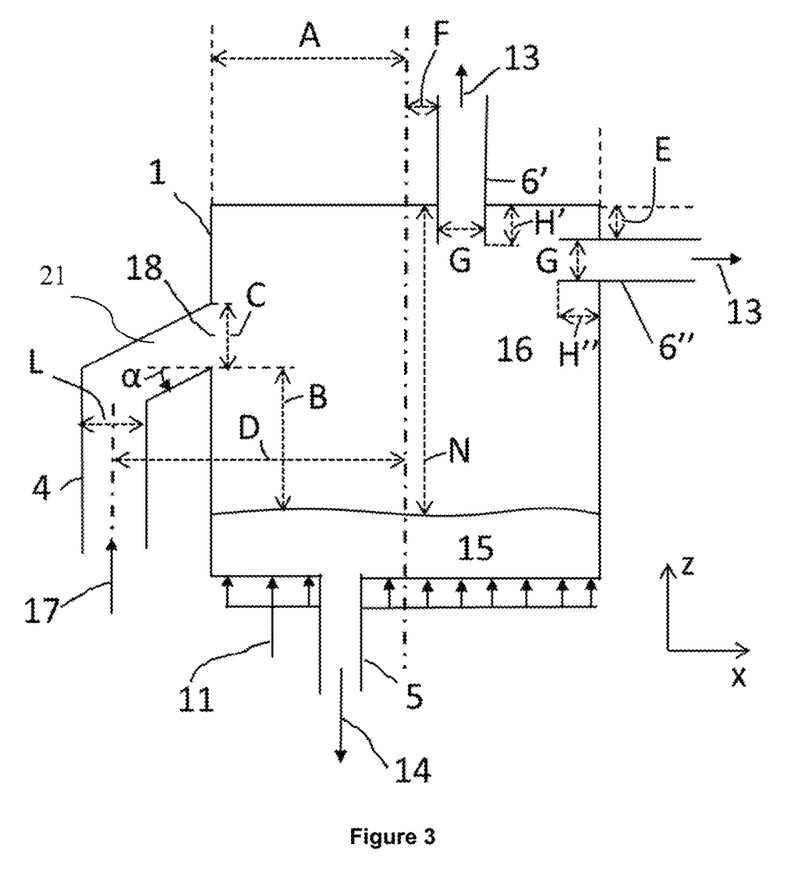
FIG. 3 illustrates a particle separator according to one embodiment of the invention.
Figure 4:
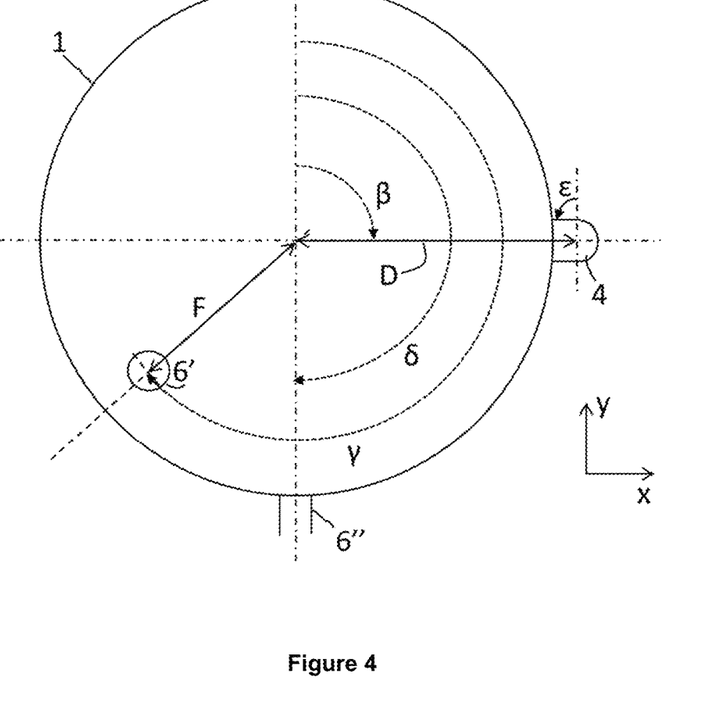
FIG. 4 illustrates, in a plan view, a particle separator according to the embodiment of the invention of FIG. 3.

FIGS. 3 and 4 illustrate, schematically and nonlimitingly, a particle separator according to one embodiment of the invention. FIG. 3 is a longitudinal section in a plane (xz) of the particle separator 1, and FIG. 4 is a plan view of the particle separator 1 in a plane (xy). The axes x and y define a horizontal plane; the axis z corresponds to the vertical axis (in the present case, the longitudinal axis of the chamber of the particle separator).

The parameters of these two figures are such as to define certain characteristic dimensions of the particle separator 1.

These two figures detail the characteristics of the feed or feeds of combustion fumes loaded with solid particles 17 which enter the particle separator 1 via the one or more intake ducts (to simplify the figures, only one intake duct 4 is shown). The figures also present the one or more outlets for gas loaded with solid fuel unburnts and ashes 13 from the particle separator 1 via the one or more outlet ducts 6. For this embodiment, the particle separator 1 is cylindrical and of diameter 2A. As a variant, the particle separator 1 may also have a rectangular cross section, or any similar form, and in that case A is the distance between the central/longitudinal axis of the chamber and a side wall of the chamber.

The number of intake ducts 4 and of outlet ducts 6 may be between 1 and 20, preferably between 1 and 10 and more preferably between 1 and 4. The ducts 4 and 6 have diameters labeled respectively as L and G. The superficial gas velocity in the ducts 4 and 6 is between 2 m/s and 30 m/s, preferably between 3 m/s and 25 m/s and more preferably between 4 m/s and 15 m/s.

In accordance with the operation illustrated in relation to FIG. 1, the gas/solid mixture 17 entering via the one or more intake ducts 4 into the particle separator 1 comes from the combustion zone 2. This combustion zone is fed with the oxygen transporter from an oxidizing zone 8, the solid fuel particles 7 and a fluidizing gas 12. The reaction of the solid fuel with the oxygen transporter, and also the fluidizing gas, produce combustion fumes comprising metal oxide particles, unburnts and fly ash, which are transported to the particle separator 1 by way of the one or more intake ducts 4.

The suspension opens out in the particle separator 1 via the intake duct 4 into a dilute phase 16 composed essentially of gas (preferably at least 95% by volume), in which the superficial velocity may be controlled and represents from 30% to 300% of the mean terminal falling velocity of the oxygen-transporting particles. Precise adjustment of the superficial velocity in zone 1 allows control over the quantity of particles carried to the outlet duct 6. The flow of particles carried in the particle separator 1 to the outlet duct 6, relative to the cross section of the separator 1, may be less than 10 kg/s/m$^2$, is typically between 0.02 and 5 kg/s/m$^2$, and may contain at least half of the unburnt particles entering via the one or more intake ducts 4.

The particles which are not carried to the outlet duct or ducts (6', 6") settle in the dense phase 15 of the particle separator 1, and are collected in the lower part of the particle separator 1 and discharged via the discharge duct 5, forming a dense flow of particles 14, to another reaction zone, for additional combustion or for reoxidizing the oxygen-transporting particles. It is possible to form a fluidized dense phase 15 at the base of the particle separator 1. In this case, the dense phase 15 may be fluidized by provision of an external gas 11 in the particle separator 1. This gas passes through the particle separator and takes part in the physical process of separation of the particles by elutriation in the dilute phase 16, before exiting via the outlet duct 6. The distance between the top of the particle separator 1 and the top of the dense phase 15 is labeled N. According to one embodiment of the invention, N is between 2 A and 40 A, preferably between 2 A and 30 A and more preferably between 2 A and 20 A.

The intake ducts 4 are located at a distance D from the center of the particle separator. For example, the distance D may correspond to the distance between the axis of the vertical portion of the intake ducts 4 and the axis of the center of the particle separator. In accordance with one implementation of the invention, the distance D is strictly positive and may be between 0 and 4 A, preferably between 0 and 2 A and more preferably between 0 and 1.5 A.

The intake ducts 4 open out in the dilute part 16 of the chamber, by virtue of a window 18 with diameter C. According to one aspect of the invention, the diameter C is between 0.5 L and 4 L, preferably between 1 L and 3 L and more preferably between 1 L and 2 L, where L is the diameter of the vertical portion of the intake duct. The widening of the end of the intake duct 21 enables a lower gas velocity than in the intake duct 4. It is therefore possible to use a high velocity in the intake duct 4 (reduction in the head loss associated with acceleration of the particles) and to reduce the velocity at which gas is introduced into the separator 1, thereby making it possible to prevent gas jets, and improving distribution within the dilute phase 16.

The vertical part of the intake duct 4 is connected to the window of diameter C by virtue of an elbow with angle $\alpha$ in the plane (xz) and optionally of angle $\varepsilon$ in the plane (xy). The angle $\alpha$ is between 1° and 89°, preferably between 10° and 70° and more preferably between 30° and 50°. The angle $\varepsilon$ is between 0° and 360°.

In addition, the angle $\beta$ defines the orientation in the plane (xy) of the intake duct 4 relative to the axis y. The angle $\beta$ is between 0° and 360°.

The position of the bottom of the window 18 is set at a distance B from the dense zone 15 (limit of the dense zone 15 and the dilute zone 16). This distance B is between 0 and N-C, preferably between 0.1(N-C) and 0.9(N-C) and more preferably between 0.2(N-C) and 0.8(N-C). This design therefore makes it possible to prevent particles in the dense part from being carried by the gas, which arrives at a higher velocity.

In these figures, two types of outlet ducts 6 are identified, with the ducts 6' sited on the upper wall of the particle separator 1, and the ducts 6" sited on the sidewall of the particle separator 1. The ducts 6' are sited at a distance F from the center of the particle separator 1. F may be between 0 and A.

In the plane (xy), $\gamma$ defines the angle between the axis y and the position of the outlet duct 6' sited at the upper wall of the separator 1. The angle $\gamma$ may be between 0° and 360°.

The ducts 6" are sited at a distance E from the upper wall of the particle separator 1. The distance E is between 0 and N.

In the plane (xy), $\delta$ defines the angle between the axis y and the position of the outlet duct 6' sited on the side part of the separator 1. The angle $\delta$ is between 0° and 360°.

Part of the ducts 6' and 6" may penetrate into the dilute zone 16 of the particle separator 1. The length H' of penetration of the ducts 6' is between 0 and N, preferably between 0 and 0.5 N and more preferably between 0 and 0.2 N. The length H" of penetration of the ducts 6" is between 0 and A, preferably between 0 and 0.5 A and more preferably between 0 and 0.2 A.

According to one embodiment example, an internal may be fitted in the particle separator 1 in the dilute phase 16 before the outlet 13. This internal allows separation to be improved.

The chemical looping combustion method according to the invention employs the chemical looping combustion device according to any of the embodiments described above or any of the combinations of said embodiments. For this method, the following steps are carried out:

a) a gas mixture from said combustion zone, comprising unburnt particles, oxygen carrier particles and combustion gases, is admitted to the chamber of the particle separator by means of at least one intake duct, the intake duct comprising at least one intake end which is inclined with respect to a horizontal plane;

b) the lightest particles, consisting predominantly of the unburnt particles, are extracted via an outlet in the upper part of the chamber of the particle separator, and the heaviest particles, consisting predominantly of the oxygen carrier particles, are discharged via the discharge duct in the lower part of the chamber;

c) a gaseous stream comprising the lightest particles extracted via the outlet duct in the upper part of the chamber are sent to the gas-solid separator;

d) a gas depleted in unburnt particles is discharged from the gas-solid separator via a duct; and e) the unburnt particles separated in the gas-solid separator are recycled to the combustion zone via a communication duct.

Comparative Example

The features and advantages of the device and of the method according to the invention will become more clearly apparent from a reading of the comparative examples hereinafter.

Figure 5A:
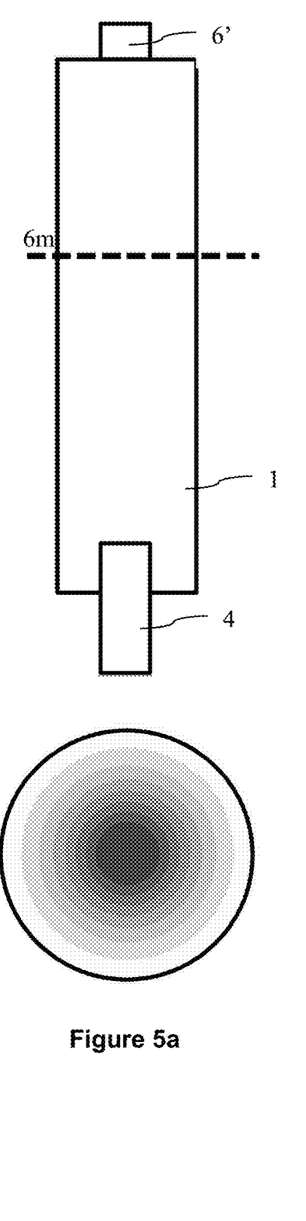
FIGS. 5a, 5b and 5c illustrate a comparison of velocity distribution in a separator, for two prior-art embodiments (FIGS. 5a and 5b) and one embodiment according to a variant of the invention (FIG. 5c).
Figure 5B:
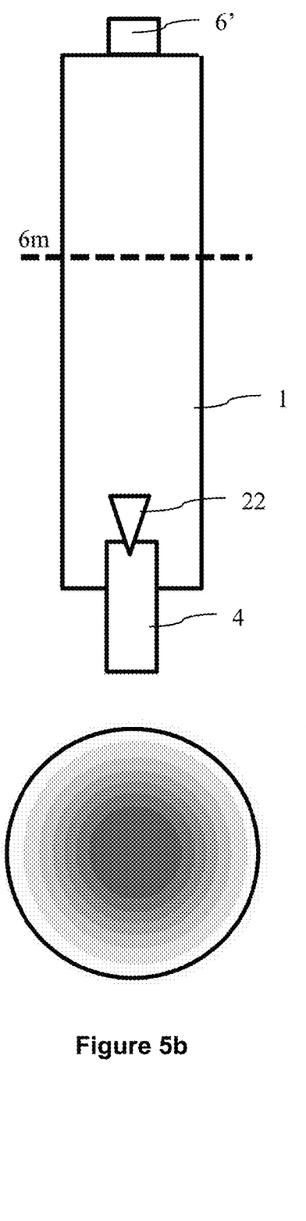
Figure 5C:
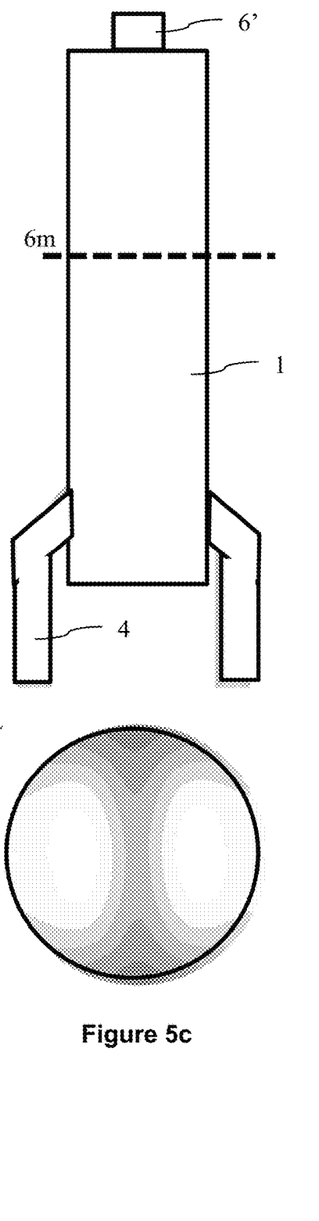

Three particle separation devices were studied via CFD (Computational Fluid Dynamics) simulations, these three devices being illustrated in the top part of FIGS. 5a to 5c:

First device (FIG. 5a): according to the prior art (as described in patent application WO 2011/151537) with an intake duct 4 entering via the bottom of the particle separator 1 and centered in the separator.

Second device (FIG. 5b): according to the prior art (in an improvement to the solution described in patent application WO 2011/151535 A2) with an intake duct 4 entering via the bottom of the particle separator 1, centered in the separator, and with the implementation of a cone 22 at the peak of this duct.

Third device (FIG. 5c): according to the invention, more particularly according to the embodiment of FIG. 2a.

The CFD simulations were carried out using the FLUENT software. Firstly, only the gas phase in the intake duct(s) 4 and the dilute part 16 is simulated. In a second stage, light particles (ashes or unburnt particles) and heavy particles (oxygen carrier) are injected in the simulation with a DPM (Discrete Particle Method) approach, in which only the gas interacts with the particles through a drag force. In this approach, the particles have no effect on the gas velocity field. This assumption is used because the gas/particle flow is considered to be diluted with a volume percentage of particles of less than 1 vol %. The particles are injected at the inlet of the intake duct(s) 4 and are able to exit either via the outlet duct 6' or via the bottom of the dilute phase 16, via an outlet duct 6" (not shown). The percentage of particles exiting via the outlet duct 6' at the top of the separator 1 is defined by a formula of the following type:

$$\eta = \frac{\text{Flow rate of particles exiting via duct}(6')}{\text{Flow rate of particles injected into}(4)}$$

Table 1 presents the simulated conditions and also the dimensions used (in reference to the dimensions illustrated in FIGS. 3 and 4).

TABLE 1

Characteristics of the particle separator

| | 1st device (prior art) | 2nd device (prior art) | 3rd device (invention) |
|---|---|---|---|
| Length A (m) | | 2 | |
| Length N (m) | | 10 | |
| Number of intake ducts | 1 | 1 | 2 |
| Diameter L (m) | 1.5 | 1.5 | 1.06 |
| Length B (m) | | | 1 |
| Length D (m) | 0 | 0 | 2.5 |
| Angle α (°) | — | — | 45 |
| Diameter C (m) | — | — | 1.06 |
| Angle β (°) | — | — | Duct 1: 90° Duct 2: 270° |
| Angle ε (°) | — | — | 90° |
| Cone diameter (m) | — | 1.06 | |

TABLE 1-continued

Characteristics of the particle separator

| | 1st device (prior art) | 2nd device (prior art) | 3rd device (invention) |
|---|---|---|---|
| Number of ducts (6') | | 1 | |
| Length F (m) | | 0 | |
| Diameter G (m) | | 1.4 | |
| Length H' (m) | | 0 | |
| Gas density (kg/m$^3$) | | 0.33 | |
| Gas viscosity (kg/m/s) | | 4.6 10$^{-5}$ | |
| Mass flow of gas injected into (4) (kg/s) | 4 | 4 | Duct 1: 2 Duct 2: 2 |
| Mass flow of gas (11) (kg/s) | | 1.1 | |
| Mass flow of heavy particles injected (kg/s) | | 60 | |
| Density of heavy particles (kg/m$^3$) | | 3300 | |
| Mean diameter of heavy particles (μm) | | 200 | |
| Mass flow of light particles injected (kg/s) | | 0.6 | |
| Density of light particles (kg/m$^3$) | | 1000 | |
| Mean diameter of heavy particles (μm) | | 50 | |

The bottom part of FIGS. 5a to 5c illustrates the profile of velocity of the gas at a height of 6 m in the particle separator. In these figures, the shades of gray correspond to the gradient of gas velocity in the particle separator, with the darkest zones corresponding to the zones for which the gas velocity is highest, and the lightest zones corresponding to the zones for which the gas velocity is lowest. It is observed that the invention makes it possible to limit the velocity gradient in the particle separator, and permits better homogeneity of the gas in the particle separator.

Table 2 presents the percentages of light and heavy particles exiting via the upper outlet duct from the particle separator 1.

TABLE 2 comparison

| | First device (prior art) | Second device (prior art) | Third device (invention) |
|---|---|---|---|
| η(light particles) | 100% | 100% | 100% |
| η(heavy particles) | 20% | 5% | 1% |

Table 2 shows that the invention enables better separation between the light and heavy particles, with only 1% of the heavy particles exiting via the top of the device.

The invention claimed is:

1. A device for chemical looping combustion using a solid fuel which generates unburnt particles and employs oxygen carrier particles, and which comprises:
    at least a combustion zone,
    a particle separator for separating particles contained in a gas mixture from the combustion zone, the particle separator comprising a chamber equipped with at least one intake duct connected to the combustion zone configured to introduce the gas mixture from the combustion zone into the particle separator, at least one discharge duct situated in the lower part of the chamber, and at least one outlet duct situated in the upper part of the chamber, the chamber being configured to contain, during operation, a dense phase in the lower part and a dilute phase in the upper part, wherein the at least one intake duct comprises successively, in the intake direction, a vertical portion, an elbow, and an intake end which is inclined by an angle α with respect to a horizontal plane, the intake end opening out within the chamber, and a gas-solid separator, the at least one outlet duct of the particle separator being connected to the gas-solid separator.

2. The combustion device as claimed in claim 1, wherein the angle α is between 10 and 70°.

3. The combustion device as claimed in claim 1, wherein the vertical portion of the intake duct is at a distance D from the center of the chamber, D being strictly positive and less than 4 A, where A is a dimension between the center of the chamber and a sidewall of the chamber.

4. The combustion device as claimed in claim 1, wherein the diameter C of the inclined intake end is between 0.5 and 4 L, where L is the diameter of the vertical portion of the intake duct.

5. The combustion device as claimed in claim 1, wherein the intake duct is entirely external to the chamber, the intake end opening out on a sidewall of the chamber.

6. The combustion device as claimed in claim 1, wherein the intake duct is at least partly internal to the chamber, the intake duct passing through the lower wall of the chamber.

7. The combustion device as claimed in claim 1, wherein the particle separator comprises between 1 and 20 intake ducts.

8. The combustion device as claimed in claim 1, wherein the intake duct opens out in the chamber, in the upper part of the chamber comprising the dilute phase.

9. The combustion device as claimed in claim 1, wherein the inclination of the intake end of the intake duct is directed toward the longitudinal axis of the chamber.

10. A method for chemical looping combustion using a solid fuel generating unburnt particles, which employs oxygen carrier particles, such as metal oxides, and employs a device for chemical looping combustion as claimed in claim 1, wherein the following steps are carried out:

a) a gaseous mixture from the combustion zone, comprising particles and combustion gases, is admitted to the chamber of the particle separator by means of at least one intake duct;

b) the lightest particles, consisting predominantly of the unburnt particles, are extracted via an outlet in the upper part of the chamber, and the heaviest particles, consisting predominantly of the oxygen carrier particles, are discharged via the discharge duct in the lower part of the chamber;

c) a gaseous stream comprising the light unburnt particles extracted via the outlet duct in the upper part of the chamber are sent to the gas-solid separator;

d) a gas depleted in unburnt particles is discharged from the gas-solid separator via a duct; and e) the unburnt particles separated in the gas-solid separator are recycled to the combustion zone via a communication duct.

11. The combustion device as claimed in claim 1, wherein the angle α is between 30 and 50°.

12. The combustion device as claimed in claim 1, wherein the vertical portion of the intake duct is at a distance D from the center of the chamber, D being strictly positive and less than 2 A, where A is a dimension between the center of the chamber and a sidewall of the chamber.

13. The combustion device as claimed in claim 1, wherein the vertical portion of the intake duct is at a distance D from the center of the chamber, D being strictly positive and less than 1.5 A, where A is a dimension between the center of the chamber and a sidewall of the chamber.

14. The combustion device as claimed in claim 1, wherein the particle separator comprises between 1 and 10 intake ducts.

15. The combustion device as claimed in claim 1, wherein the particle separator comprises between 1 and 4 intake ducts.

* * * * *